No. 856,067. PATENTED JUNE 4, 1907.
R. JOHNS.
PLUNGER FOR BOTTLE MACHINES.
APPLICATION FILED OCT. 12, 1906.
2 SHEETS—SHEET 1.
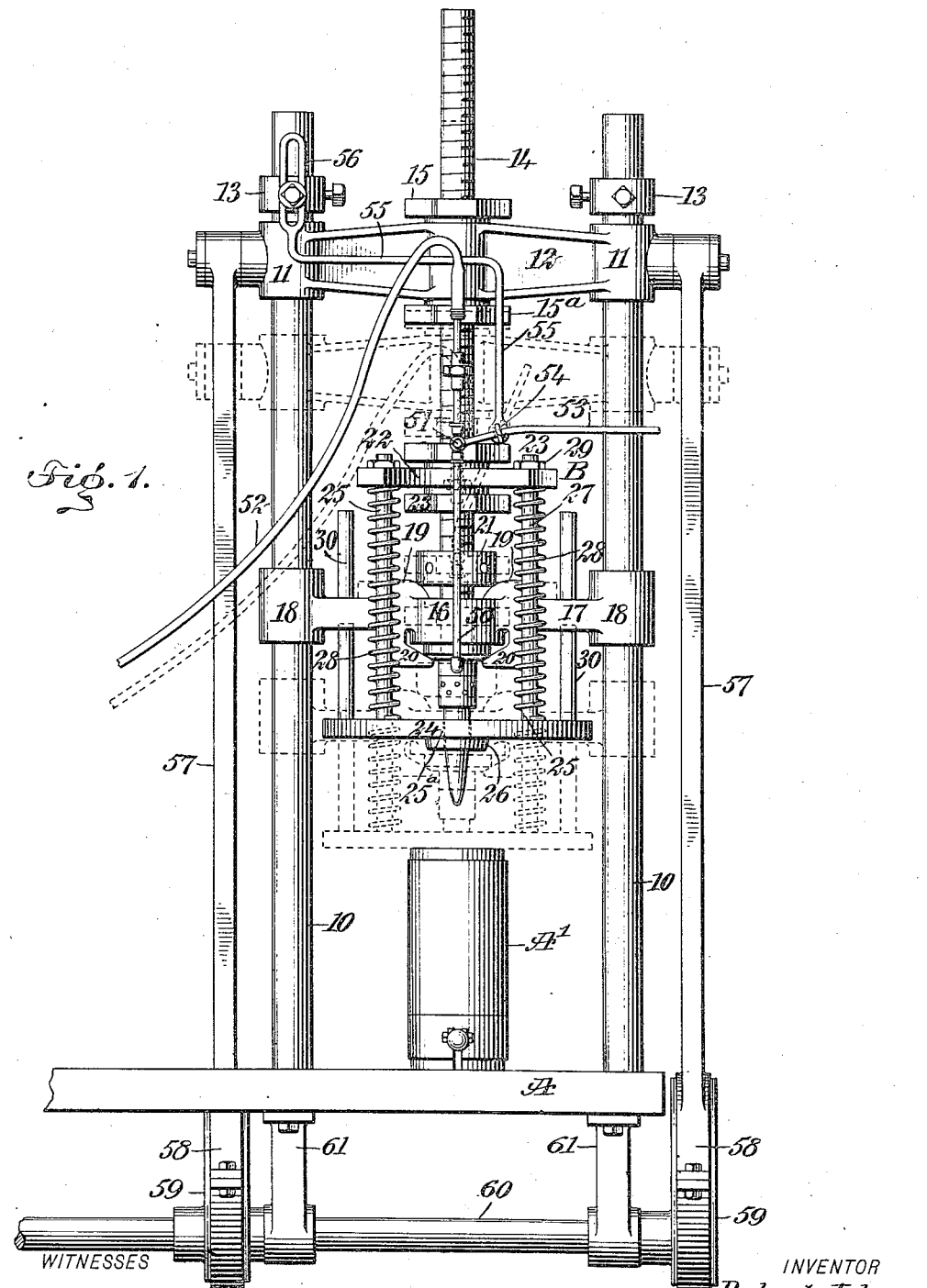
WITNESSES
INVENTOR
Robert Johns
BY
ATTORNEYS No. 856,067. PATENTED JUNE 4, 1907.
R. JOHNS.
PLUNGER FOR BOTTLE MACHINES.
APPLICATION FILED OCT. 12, 1906.
2 SHEETS—SHEET 2.
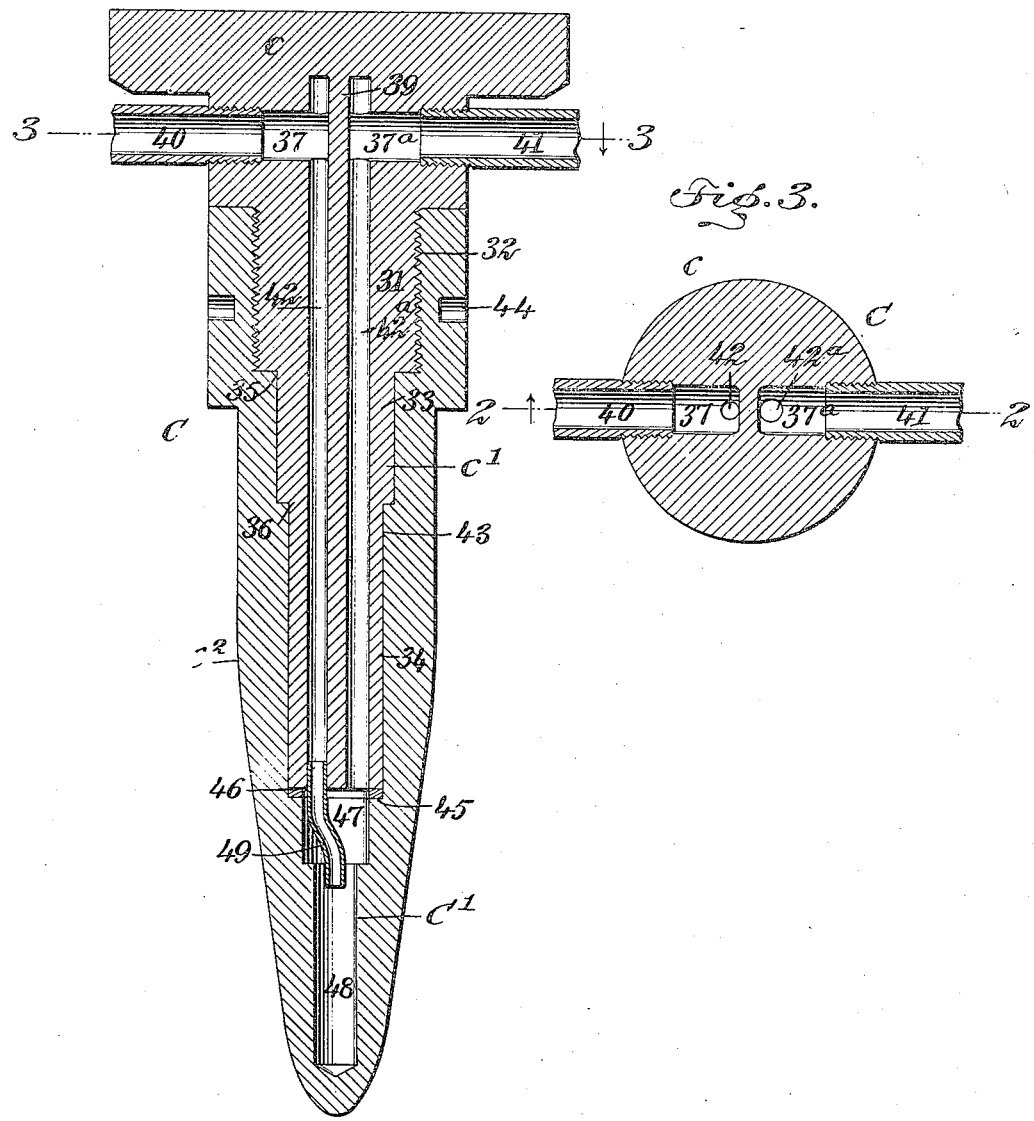
WITNESSES
INVENTOR
Robert Johns
BY
ATTORNEYS

UNITED STATES PATENT OFFICE.

ROBERT JOHNS, OF FAIRMONT, WEST VIRGINIA, ASSIGNOR OF ONE-THIRD TO JOHN B. JOHNS AND ONE-THIRD TO WILLIAM C. JOHNS, BOTH OF FAIRMONT, WEST VIRGINIA.

PLUNGER FOR BOTTLE-MACHINES.

No. 856,067.      Specification of Letters Patent.      Patented June 4, 1907.

Application filed October 12, 1906. Serial No. 338,579.

*To all whom it may concern:*

Be it known that I, ROBERT JOHNS, a citizen of the United States, and a resident of Fairmont, in the county of Marion and State of West Virginia, have invented a new and Improved Plunger for Bottle-Machines, of which the following is a full, clear, and exact description.

The purpose of the invention is to provide an improved construction of plunger whereby to preserve a proper and uniform degree of temperature necessary to the successful operation of such plungers as are commonly used as a part of machines and presses employed in the manufacture of bottles, jars and other tubular glass ware.

The plunger is an essential portion of any and all jar and bottle machines and in connection with the blank molds and top rings forms the head, mouth and throat of the jar or bottle made.

The plunger is forced into the molten glass in the blank form, and must be held therein from four to eight seconds, or until the neck of the jar or bottle is sufficiently cooled to harden and retain its shape.

Since the molten glass completely envelops the plunger from one to six inches of its length, the plunger unless cooled would be as hot as the glass in a few plunges or minutes. The instant the plunger shows color, it clings to the molten glass, and if it falls below a searing heat it cracks the glass against which it is pressed.

The little variation that glass will tolerate between sticking when too hot and cracking when too cold has always made the plunger a perplexing problem and has always been a cause of much annoyance and considerable loss.

The means heretofore employed and of which I have knowledge for keeping the plunger cool are blasts of air from a fan and compressed air and water. In all of these methods a constant stream is applied to or run through the plunger, and under the most perfect arrangements of any or all of these means only partial success is obtained.

I am aware that a plunger has been employed having a chamber through which a constant stream of water is passed, but in this system if the rate of work is changed, which is frequent and unavoidable, a too hot or a too cold plunger is the result.

I aim to overcome the foregoing difficulties by manually or automatically, preferably the latter, running water through the plunger during the actual time it is in the molten glass, and stopping the flow of water when the plunger is withdrawn.

A further purpose of the invention is to attach the devices for controlling the water valve to the machine or press so that the said valve is opened by the motion of the machine as the plunger descends into the glass, and is closed by the return motion as the plunger is withdrawn; therefore, since the water passes through the plunger only while it is in the glass said plunger preserves an even temperature, no matter what the rate of product may be.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a front elevation of the machine for making glass bottles having the improved plunger applied; Fig. 2 is an enlarged central longitudinal section through the plunger, the section being taken substantially on the line 2—2 of Fig. 3; and Fig. 3 is a horizontal section through the plunger, taken practically on the line 3—3 of Fig. 2.

The frame of the machine or press essentially consists of a base A, from which parallel fixed pillars or posts 10 are carried upward; and these posts or pillars at their upper ends extend loosely through eyes 11 formed at the end portions of a cross head 12, the cross head being adapted to have sliding movement on said posts or pillars, and suitable collars 13 are secured to said posts above the eyes of the cross head.

A carriage B is provided for the plunger C. This carriage may be of any approved construction. As illustrated it consists of a threaded rod 14, that passes through the central portion of the cross head 12 and through nuts 15 and 15ª at the top and bottom portions of said cross head as shown in Fig. 1. The lower end of the said screw rod 14 is swiveled or equivalently secured within the socket center 16 of a cross bar 17, having eyes 18 at its ends, adapted for free sliding movement on the posts or pillars 10 below the cross-head 12. The cross bar 17 is usually provided with upwardly-extending opposing enlargements at the opposite sides of the upper edge of its socket eyes 16, as is also shown in Fig. 1, and with inwardly projecting foot members 20 that are located below the bottom of the said socket member as is also shown in Fig. 1. A nut 21 is screwed upon the rod 14 to a bearing against the enlargements 19 of the cross head.

In the formation of the carriage, a gage is provided, which consists of an upper plate member 22, through which the threaded rod 14 passes, and other nuts 23 above and below the central portion of said plate member 22, together with a lower circular plate 24, which is adapted at the downward movement of the carriage to engage with the upper edge of the blank mold A' that may be employed, as is shown by dotted lines in Fig. 1.

Rods 25 are secured to the bottom circular plate 24 of the gage, and these rods extend up loosely through the top plate of said gage; and said rods 25 are surrounded by springs 28 and are provided at their upper ends with suitable nuts 29, which engage with the upper face of an upper gage plate 22.

An opening 25$^a$ is made in the central portion of the bottom plate 24 of the gage, through which opening the working end of the plunger is adapted to extend and through which its body portion may pass; and said opening is provided with a downwardly-extending marginal flange 26, which flange enters the mold when the gage is in its lowest position. The said bottom plate 24 of the gage is also provided with upwardly-extending guide rods 30, that pass loosely through openings in the end portions of the cross bar 17.

The plunger C is illustrated in detail in Figs. 2 and 3, and comprises a head section $c$, provided with an integral cooling finger $c'$, and the plunger proper or body section $c^2$. The cooling finger is made in three decreasing diameters. The upper portion 31, which is of the greatest diameter but of less diameter than the shank of the head member, is provided with an exterior thread 32; the next section 33 is of still less diameter and is plain, and the last or lowest section 34 is of still less diameter and of greater length than the other sections. By reason of the aforesaid stepping of the cooling finger, two annular shoulders 35 and 36 are formed.

In the shank member of the head $c$ of the plunger C, a horizontal receiving chamber 37 is provided, and an opposing discharge chamber 37$^a$, the two chambers being separated by a partition 39. An inlet pipe 40 connects with the chamber 37 while an outlet pipe 41 connects with the chamber 37$^a$; and two parallel channels 42 and 42$^a$ extend the full length of the cooling finger, crossing the receiving and the outlet chambers, which are adapted to receive a liquid, water for example, the channel 42 being the receiving channel and the channel 42$^a$ the discharge channel. The main or body section $c^2$ of the plunger is provided with an interior chamber, formed correspondingly to the exterior of the cooling finger $c'$; and the body or main section $c^2$ is screwed upon the threaded section 31 of the said cooling finger, and is provided with exterior recesses 44, whereby a spanner wrench may be applied to said body section of the plunger to secure it to the head section or unscrew it therefrom without dislodging said head section from the carriage and without interfering with the cooling finger.

A seat 45 for the bottom of the cooling finger is provided at the lower portion of the main or body section $c^2$ of the plunger; but the said cooling finger does not rest directly upon this seat, but upon an interposed copper gasket 46, which provides an effective water seal at that point, and compels the water to follow the channels 42 and 42$^a$.

Immediately below the seat 45 in the body or main section $c^2$ of the plunger, a cooling chamber 47 is created, and said cooling chamber 47 is provided with a downward extension 48 of less diameter, that occupies a central position relatively to the lower end or point of the plunger, and extends nearly to its lowest extremity, as shown in Fig. 2. The outlet channel 42$^a$ is directly in communication with the cooling chamber 47; but the water entering at the receiving channel 42 in passing out from said channel is received in a tube 49, made of low brass and which extends from the upper portion of the cooling chamber and down into the upper central portion of the extension 48 of said chamber, so as to direct the cooling water to the point in the plunger where it will accomplish the best results.

In practice, the head of the plunger C is received partially within the socket section 16 of the cross bar 17, and the under portion of the head rests against the arms 20 below the said socket section as is shown in Fig. 1. The receiving pipe 40 is provided with an outer extension 50, and in this extension a valve 51 is provided, and said extension pipe 50 is connected with a flexible pipe or tube 52, connected with any source of liquid supply; and a suitable outlet pipe for the water is connected with the outlet pipe 41 of the plunger head. The plug of the valve 51 is provided with an attached arm 53, and this arm passes loosely through an eye 54 which is at the lower end of a fixed arm 55, secured preferably to the upper end of one of the posts or pillars 10 as is shown at 56 in Fig. 1. The carriage is moved upward and downward by means of connecting rods 57, pivotally attached to the end portions of the cross head 12, and by means of straps 58 with eccentrics 59 secured on the drive shaft 60 usually located below the base A, and mounted to turn in brackets 61.

In operation, as the carriage descends and the plunger C enters the mold A', water is automatically turned on by reason of the valve 51 being opened at that time by the upward movement of its attached arm 53, and water will be constantly supplied to the said plunger during the entire time the plunger is in the mold. However, as soon as the plunger leaves the mold, the arm 53 is pressed downward at the upward movement of the carriage B, thus closing the valve 51 and cutting off the supply of water, which supply remains cut off until the plunger again descends.

Having thus described my invention, I claim as new, and desire to secure by Letters Patent,—

1. In machines for making hollow glass ware, a plunger having an inlet and an outlet for liquid, and means for turning on the liquid supplied at the working stroke of the plunger and cutting off such supply on the return stroke of the plunger.

2. In machines for making hollow glass ware, a sliding support, a plunger carried thereby, provided with a cooling finger, means for supplying liquid to and discharging liquid from the plunger through its cooling finger, and devices for automatically turning on the supply of liquid on the working stroke of the plunger and cutting off such supply at the return stroke.

3. In a machine for making hollow glass ware, guides, a carriage mounted to slide on the guides, means for moving said carriage up and down, a plunger supported by the carriage, for supplying liquid to the plunger and discharging liquid therefrom, a valve located in the supply medium, an arm extending from said valve, a stationary receiver for the said arm, through which the arm loosely passes, which receiver is independent of the carriage, whereby on the down stroke of the carriage and plunger water is automatically supplied to the latter and is automatically cut off at the up or return stroke of the carriage and the plunger.

4. In a machine for making hollow glass ware, the combination with stationary guides, a cross head mounted to slide on the guides, means for raising and lowering the cross head, a plunger supported by the carriage, provided with a cooling finger having inlet and outlet channels for liquid in its cooling finger, and liquid receiving cooling chambers in the body of the plunger beneath said fingers, the receiving channel being provided with an added tube which extends therefrom centrally into said cooling chamber, and means for supplying liquid to the plunger at its downward stroke and cutting off said supply at its upward stroke.

5. In machines for making hollow glass ware, a plunger consisting of a head, a cooling finger integral with the head, and a main body having screw connection with said cooling finger, the said body or main section being provided near its lower end with a metal gasket, upon which gasket the lower end of the cooling finger bears when the parts of the plunger are assembled, the main or body portion of the plunger being provided with a cooling chamber below the said gasket, constructed in two diameters, its upper portion being of the greatest diameter, the head being provided with a liquid-receiving chamber and a liquid discharging chamber, the cooling finger being provided with a liquid-receiving channel and a liquid-discharging channel, both in communication with said cooling chamber of the main or body section of the plunger, and a tube which extends from the outlet of the receiving channel into the cooling chamber of the body of the plunger, occupying a central position at its outlet end within said cooling chamber.

In testimony whereof I have signed my name to this specification in the presence of two subscribing witnesses.

ROBERT JOHNS.

Witnesses:
FREDERICK T. MARTIN,
ARTHUR G. MARTIN.